(12) United States Patent
Murakawa

(10) Patent No.: US 10,303,129 B2
(45) Date of Patent: May 28, 2019

(54) MACHINING TIME PREDICTION DEVICE

(71) Applicant: FANUC Corporation, Yamanashi (JP)

(72) Inventor: Kazuhiko Murakawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/409,109

(22) Filed: Jan. 18, 2017

(65) Prior Publication Data

US 2017/0205779 A1    Jul. 20, 2017

(30) Foreign Application Priority Data

Jan. 19, 2016    (JP) .................................. 2016-008244

(51) Int. Cl.
    *G05B 13/02*       (2006.01)
    *G05B 19/416*      (2006.01)
                  (Continued)

(52) U.S. Cl.
    CPC .............. *G05B 13/026* (2013.01); *B23H 7/20* (2013.01); *G05B 19/4069* (2013.01); *G05B 19/416* (2013.01); *B23H 7/02* (2013.01); *G05B 2219/31407* (2013.01); *G05B 2219/31412* (2013.01); *G05B 2219/35309* (2013.01);
                  (Continued)

(58) Field of Classification Search
    None
    See application file for complete search history.

(56) References Cited

U.S. PATENT DOCUMENTS 4,980,532 A    12/1990   Morishita
6,549,824 B1    4/2003   Satou et al.
                 (Continued)

FOREIGN PATENT DOCUMENTS

CN       1292895 A     4/2001
CN     104698982 A     6/2015
           (Continued)

OTHER PUBLICATIONS

Decision to Grant a Patent in JP Application No. 2016-008244, dated Dec. 19, 2017, 6 pp.
(Continued)

*Primary Examiner* — Carlos R Ortiz Rodriguez
(74) *Attorney, Agent, or Firm* — Hauptman Ham, LLP

(57) ABSTRACT

Provided is a machining time prediction device including a predicted machining speed table where predicted machining speeds are registered in association with shape groups used for classification based on a shape of a machining path, a machining path generation unit generating machining path data including the machining path based on the program, a shape group determination unit determining which shape groups partial machining paths belong to, a path length addition unit adding and summarizing path lengths of the partial machining paths for the respective shape groups, a predicted machining time calculation unit calculating predicted machining times of the respective shape groups on the basis of a predicted machining speed table and the path lengths of the respective shape groups, a predicted machining time summation unit calculating a predicted machining time of the machining path by adding the predicted machining times of the respective shape groups, and a display unit displaying the predicted machining time of the machining path.

4 Claims, 13 Drawing Sheets

| SHAPE GROUP | PATH LENGTH | PREDICTED MACHINING TIME |
|---|---|---|
| STRAIGHT LINE PORTION (TAPER A) | 150.0000 mm | 20 min |
| STRAIGHT LINE PORTION (TAPER B) | 250.0000 mm | 60 min |
| STRAIGHT LINE PORTION (TAPER C) | 350.0000 mm | 120 min |
| ARC PORTION (TAPER A) | 100.0000 mm | 15 min |
| ARC PORTION (TAPER B) | 200.0000 mm | 30 min |
| ARC PORTION (TAPER C) | 300.0000 mm | 150 min |
| MINUTE-RADIUS ARC PORTION (RADIUS A) | 15.0000 mm | 30 min |
| MINUTE-RADIUS ARC PORTION (RADIUS B) | 25.0000 mm | 60 min |
| MINUTE-RADIUS ARC PORTION (RADIUS C) | 35.0000 mm | 120 min |
| ACUTE-ANGLE CORNER PORTION (CORNER ANGLE A) | 10.0000 mm | 45 min |
| ACUTE-ANGLE CORNER PORTION (CORNER ANGLE B) | 20.0000 mm | 90 min |
| ACUTE-ANGLE CORNER PORTION (CORNER ANGLE C) | 30.0000 mm | 180 min |
| TOTAL | 1485.0000 mm | 9 h 20 min |

(51) Int. Cl.
  *B23H 7/20* (2006.01)
  *G05B 19/4069* (2006.01)
  *B23H 7/02* (2006.01)

(52) U.S. Cl.
  CPC .............. *G05B 2219/36219* (2013.01); *G05B 2219/45043* (2013.01)

(56) References Cited

U.S. PATENT DOCUMENTS

| | | |
|---|---|---|
| 2003/0110006 A1 | 6/2003 | Nakamura |
| 2005/0228533 A1 | 10/2005 | Hioki et al. |
| 2006/0065638 A1 | 3/2006 | Sasaki et al. |
| 2015/0183038 A1 | 7/2015 | Takemoto et al. |

FOREIGN PATENT DOCUMENTS

| | | |
|---|---|---|
| CN | 104741713 A | 7/2015 |
| EP | 0649698 A1 | 4/1995 |
| JP | 63-39730 A | 2/1988 |
| JP | H03111125 A | 5/1991 |
| JP | 4-5316 U | 1/1992 |
| JP | 4-30914 A | 2/1992 |
| JP | 6-51821 A | 2/1994 |
| JP | H06320344 A | 11/1994 |
| JP | 7-256518 A | 10/1995 |
| JP | 2001-157923 A | 6/2001 |
| JP | 2006-305689 A | 11/2006 |
| JP | 2015-3352 A | 1/2015 |

OTHER PUBLICATIONS

Extended European Search Report in EP Application No. 17151999.4, dated Jul. 7, 2017.
Office Action in CN Application No. 201710034385.7, dated Sep. 5, 2018, 14 pp.

FIG.3

| SHAPE GROUP | PATH LENGTH |
|---|---|
| STRAIGHT LINE PORTION (TAPER A) | 150.0000 mm |
| STRAIGHT LINE PORTION (TAPER B) | 250.0000 mm |
| STRAIGHT LINE PORTION (TAPER C) | 350.0000 mm |
| ARC PORTION (TAPER A) | 100.0000 mm |
| ARC PORTION (TAPER B) | 200.0000 mm |
| ARC PORTION (TAPER C) | 300.0000 mm |
| MINUTE-RADIUS ARC PORTION (RADIUS A) | 15.0000 mm |
| MINUTE-RADIUS ARC PORTION (RADIUS B) | 25.0000 mm |
| MINUTE-RADIUS ARC PORTION (RADIUS C) | 35.0000 mm |
| ACUTE-ANGLE CORNER PORTION (CORNER ANGLE A) | 10.0000 mm |
| ACUTE-ANGLE CORNER PORTION (CORNER ANGLE B) | 20.0000 mm |
| ACUTE-ANGLE CORNER PORTION (CORNER ANGLE C) | 30.0000 mm |

FIG.4

| MACHINING CONDITION NUMBER 1 | SHAPE GROUP | PREDICTED MACHINING SPEED |
|---|---|---|
| | STRAIGHT LINE PORTION (TAPER A) | 30.0 mm/min |
| | STRAIGHT LINE PORTION (TAPER B) | 25.0 mm/min |
| | STRAIGHT LINE PORTION (TAPER C) | 20.0 mm/min |
| | ARC PORTION (TAPER A) | 30.0 mm/min |
| | ARC PORTION (TAPER B) | 25.0 mm/min |
| | ARC PORTION (TAPER C) | 20.0 mm/min |
| | MINUTE-RADIUS ARC PORTION (RADIUS A) | 8.0 mm/min |
| | MINUTE-RADIUS ARC PORTION (RADIUS B) | 4.0 mm/min |
| | MINUTE-RADIUS ARC PORTION (RADIUS C) | 2.0 mm/min |
| | ACUTE-ANGLE CORNER PORTION (CORNER ANGLE A) | 6.0 mm/min |
| | ACUTE-ANGLE CORNER PORTION (CORNER ANGLE B) | 3.0 mm/min |
| | ACUTE-ANGLE CORNER PORTION (CORNER ANGLE C) | 1.0 mm/min |

⋮

| MACHINING CONDITION NUMBER N | SHAPE GROUP | PREDICTED MACHINING SPEED |
|---|---|---|
| | STRAIGHT LINE PORTION (TAPER A) | 20.0 mm/min |
| | STRAIGHT LINE PORTION (TAPER B) | 15.0 mm/min |
| | STRAIGHT LINE PORTION (TAPER C) | 10.0 mm/min |
| | ARC PORTION (TAPER A) | 20.0 mm/min |
| | ARC PORTION (TAPER B) | 15.0 mm/min |
| | ARC PORTION (TAPER C) | 10.0 mm/min |
| | MINUTE-RADIUS ARC PORTION (RADIUS A) | 4.0 mm/min |
| | MINUTE-RADIUS ARC PORTION (RADIUS B) | 2.0 mm/min |
| | MINUTE-RADIUS ARC PORTION (RADIUS C) | 1.0 mm/min |
| | ACUTE-ANGLE CORNER PORTION (CORNER ANGLE A) | 3.0 mm/min |
| | ACUTE-ANGLE CORNER PORTION (CORNER ANGLE B) | 2.0 mm/min |
| | ACUTE-ANGLE CORNER PORTION (CORNER ANGLE C) | 0.5 mm/min |

FIG.5

| MACHINING CONDITION NUMBER N | WORK THICKNESS | SHAPE GROUP | PREDICTED MACHINING SPEED |
|---|---|---|---|
| | 0~5.0mm | STRAIGHT LINE PORTION (TAPER A) | 50.0 mm/min |
| | | ... | ... |
| | | ACUTE-ANGLE CORNER PORTION (CORNER ANGLE C) | 4.0 mm/min |
| | 5.0~10.0mm | STRAIGHT LINE PORTION (TAPER A) | 30.0 mm/min |
| | | ... | ... |
| | | ACUTE-ANGLE CORNER PORTION (CORNER ANGLE C) | 2.0 mm/min |
| | 10.0~20.0mm | STRAIGHT LINE PORTION (TAPER A) | 10.0 mm/min |
| | | ... | ... |
| | | ACUTE-ANGLE CORNER PORTION (CORNER ANGLE C) | 0.3 mm/min |
| | ... | STRAIGHT LINE PORTION (TAPER A) | 5.0 mm/min |
| | | ... | ... |
| | | ACUTE-ANGLE CORNER PORTION (CORNER ANGLE C) | 0.1 mm/min |

FIG.6

| SHAPE GROUP | PATH LENGTH | PREDICTED MACHINING TIME |
|---|---|---|
| STRAIGHT LINE PORTION (TAPER A) | 150.0000 mm | 20 min |
| STRAIGHT LINE PORTION (TAPER B) | 250.0000 mm | 60 min |
| STRAIGHT LINE PORTION (TAPER C) | 350.0000 mm | 120 min |
| ARC PORTION (TAPER A) | 100.0000 mm | 15 min |
| ARC PORTION (TAPER B) | 200.0000 mm | 30 min |
| ARC PORTION (TAPER C) | 300.0000 mm | 150 min |
| MINUTE-RADIUS ARC PORTION (RADIUS A) | 15.0000 mm | 30 min |
| MINUTE-RADIUS ARC PORTION (RADIUS B) | 25.0000 mm | 60 min |
| MINUTE-RADIUS ARC PORTION (RADIUS C) | 35.0000 mm | 120 min |
| ACUTE-ANGLE CORNER PORTION (CORNER ANGLE A) | 10.0000 mm | 45 min |
| ACUTE-ANGLE CORNER PORTION (CORNER ANGLE B) | 20.0000 mm | 90 min |
| ACUTE-ANGLE CORNER PORTION (CORNER ANGLE C) | 30.0000 mm | 180 min |
| TOTAL | 1485.0000 mm | 9 h 20 min |

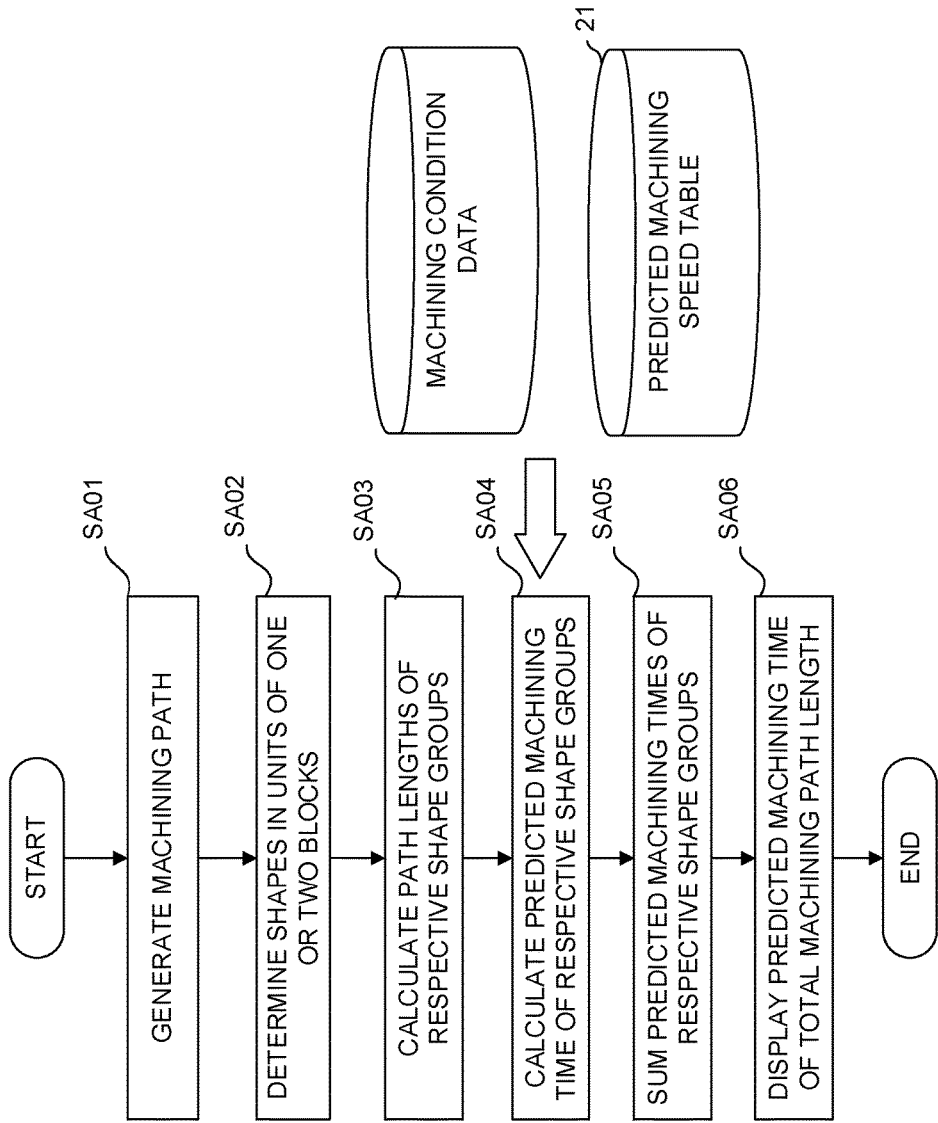

FIG.9

| SHAPE GROUP | MACHINING-COMPLETED PATH LENGTH | EXECUTION-COMPLETED MACHINING TIME |
|---|---|---|
| STRAIGHT LINE PORTION (TAPER A) | 15.0000 mm | 2.0 min |
| STRAIGHT LINE PORTION (TAPER B) | 25.0000 mm | 5.6 min |
| STRAIGHT LINE PORTION (TAPER C) | 35.0000 mm | 11.7 min |
| ARC PORTION (TAPER A) | 10.0000 mm | 1.5 min |
| ARC PORTION (TAPER B) | 20.0000 mm | 3.0 min |
| ARC PORTION (TAPER C) | 30.0000 mm | 15.0 min |
| MINUTE-RADIUS ARC PORTION (RADIUS A) | 1.5000 mm | 3.0 min |
| MINUTE-RADIUS ARC PORTION (RADIUS B) | 2.5000 mm | 6.3 min |
| MINUTE-RADIUS ARC PORTION (RADIUS C) | 3.5000 mm | 11.7 min |
| ACUTE-ANGLE CORNER PORTION (CORNER ANGLE A) | 1.0000 mm | 5.0 min |
| ACUTE-ANGLE CORNER PORTION (CORNER ANGLE B) | 2.0000 mm | 10.0 min |
| ACUTE-ANGLE CORNER PORTION (CORNER ANGLE C) | 3.0000 mm | 30.0 min |
| TOTAL | 148.5000 mm | 1 h 45 min |

FIG.10

| SHAPE GROUP | MACHINING-COMPLETED PATH LENGTH | EXECUTION-COMPLETED MACHINING TIME | AVERAGE MACHINING SPEED |
|---|---|---|---|
| STRAIGHT LINE PORTION (TAPER A) | 15.0000 mm | 2.0 min | 7.5 mm/min |
| STRAIGHT LINE PORTION (TAPER B) | 25.0000 mm | 5.6 min | 4.2 mm/min |
| STRAIGHT LINE PORTION (TAPER C) | 35.0000 mm | 11.7 min | 3.0 mm/min |
| ARC PORTION (TAPER A) | 10.0000 mm | 1.5 min | 6.7 mm/min |
| ARC PORTION (TAPER B) | 20.0000 mm | 3.0 min | 6.5 mm/min |
| ARC PORTION (TAPER C) | 30.0000 mm | 15.0 min | 2.0 mm/min |
| MINUTE-RADIUS ARC PORTION (RADIUS A) | 1.5000 mm | 3.0 min | 0.5 mm/min |
| MINUTE-RADIUS ARC PORTION (RADIUS B) | 2.5000 mm | 6.3 min | 0.4 mm/min |
| MINUTE-RADIUS ARC PORTION (RADIUS C) | 3.5000 mm | 11.7 min | 0.3 mm/min |
| ACUTE-ANGLE CORNER PORTION (CORNER ANGLE A) | 1.0000 mm | 5.0 min | 0.2 mm/min |
| ACUTE-ANGLE CORNER PORTION (CORNER ANGLE B) | 2.0000 mm | 10.0 min | 0.2 mm/min |
| ACUTE-ANGLE CORNER PORTION (CORNER ANGLE C) | 3.0000 mm | 30.0 min | 0.1 mm/min |

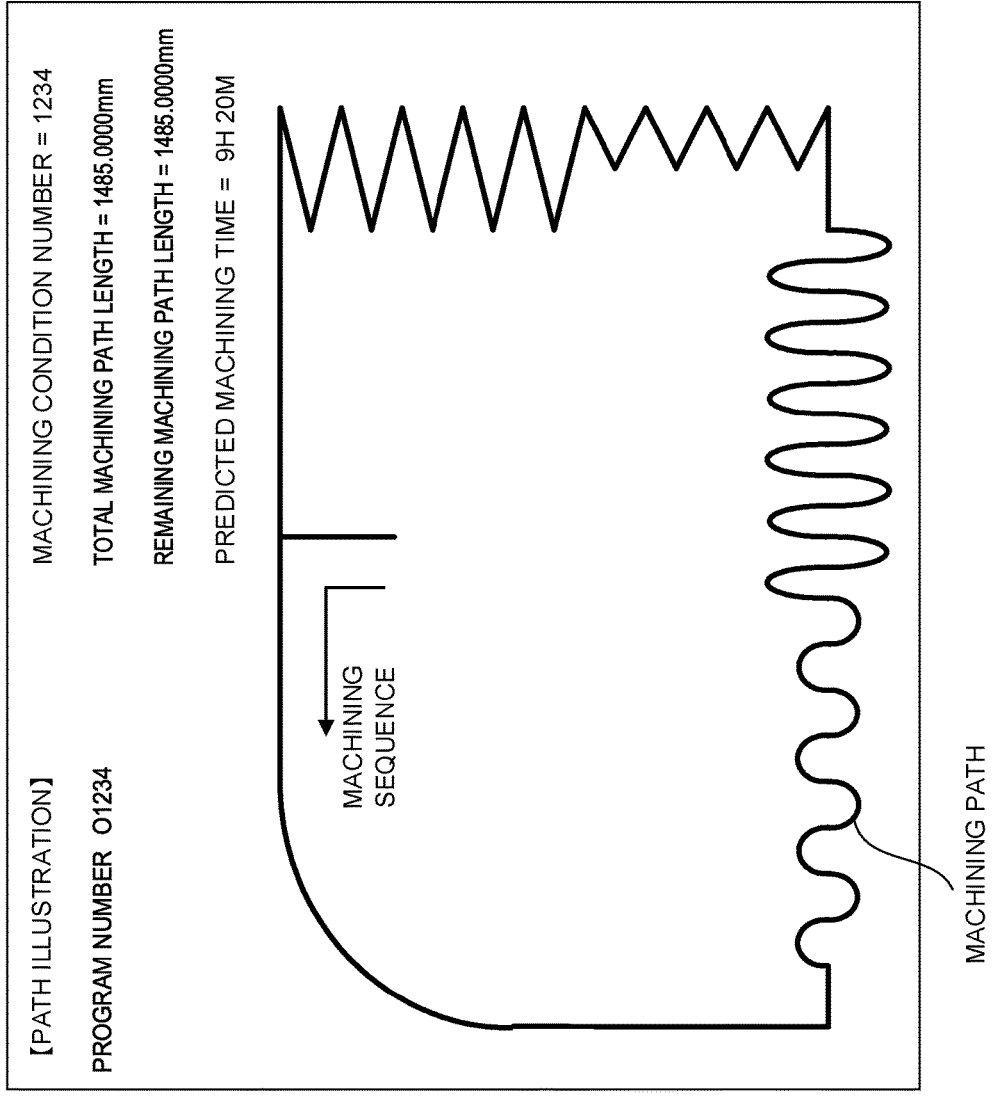

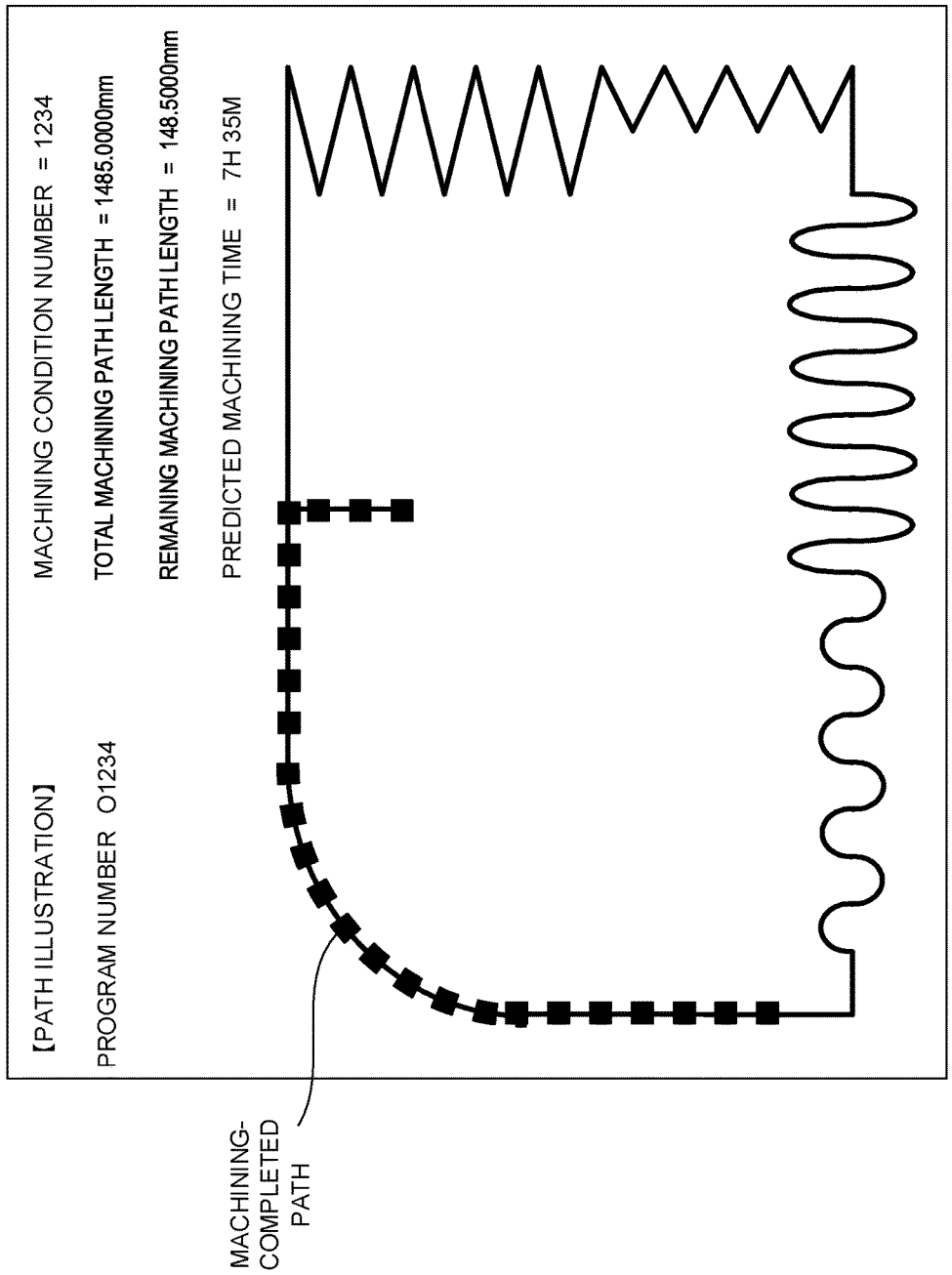

MACHINING TIME PREDICTION DEVICE

RELATED APPLICATIONS

The present application claims priority to Japanese Patent Application Number 2016-008244, filed Jan. 19, 2016, the disclosure of which is hereby incorporated by reference herein in its entirety.

BACKGROUND OF THE INVENTION

1. Field of the Invention

The present invention relates to a machining time prediction device, and more particularly, to a machining time prediction device in wire discharge machining.

2. Description of the Related Art

Since wire discharge machining requires a very long machining time, in many case, the wire discharge machining is performed in an unattended manner. Therefore, in some cases, a machining end time is unclear, and after the machining is ended, a workpiece is left along, the workpiece is rusted. In addition, since the machining time is long, a predicted machining time is information necessary for estimating work cost.

In order to solve the above-described problems, for example, JP 06-320344 A discloses a technique of obtaining a total machining path length through simulation of automatic operation and obtaining a predicted machining time through (total machining path length)÷(predicted machining speed) by using a predicted machining speed based on a machining condition indicated by screen setting or a machining program. In addition, JP 03-111125 A discloses a technique of calculating an average machining speed of machining-completed path from a machining-completed path length and an execution-completed machining time during automatic operation of actual machining and correcting a predicted machining time of a remaining machining path through (remaining machining path length)÷(average machining speed) by using a result of the calculation.

However, in the wire discharge machining, the machining speeds are greatly different according to a difference in workpiece thickness or machining shape such as a taper, an acute corner, or a minute-radius arc. For this reason, if only one predicted machining speed based on a machining condition is prepared, it is difficult to obtain predicted machining times of various machining paths at a good accuracy.

In addition, in the case of the method of obtaining the average machining speed from the machining-completed path length and the execution-completed machining time during the actual machining and correcting the predicted machining time of the remaining machining path by using the value, with respect to machining where a large number of shapes having high machining speeds exist in the first half of the machining and a large number of shape having low machining speeds exist in the second half of the machining, there occurs a large error in the corrected predicted machining time of the remaining machining path.

FIG. 12 is a screen of simulation of automatic operation performed in a wire discharge machining device and illustrates a machining program path, a selected machining condition number, a total machining path length and a remaining machining path length calculated through simulation, and a predicted machining time calculated from a predicted machining speed according to the selected machining condition. Before the actual machining is started, the remaining machining path length is set to have the same as that of the total machining path length.

FIG. 13 is a screen during the actual machining when the actual machining is started after the simulation illustrated in FIG. 12 and illustrates a machining-completed path so as to overlap a path according to the simulation. In the screen of FIG. 13, as the actual machining progresses, the remaining machining path length is decreased. The average machining speed is obtained from the machining-completed path length and the execution-completed machining time. Accordingly, the predicted machining time of the remaining machining path length is corrected. However, in the machining path illustrated in FIG. 13, since minute-radius arcs or acute-angle corner portions causing a decrease in machining speed are concentrated on the remaining machining path, it is considered that a larger error occurs in the predicted machining time of the remaining machining path length.

As described above, in the method of calculating the predicted machining time in the related art, since the accuracy is low, there is a problem in that it is difficult to apply the method to manage machining plan or estimate work cost.

SUMMARY OF THE INVENTION

The present invention is to provide a machining time prediction device capable of predicting a machining time of a wire discharge machining including a mixture of machining having different machining shapes at a good accuracy.

According to an aspect of the present invention, there is provided a machining time prediction device predicting a time taken for machining by a wire discharge machining device based on a program, including: a predicted machining speed table where predicted machining speeds are registered in association with shape groups used for classification based on at least a shape of a machining path; a machining path generation unit generating machining path data including the machining path based on the program; a shape group determination unit determining which shape groups among the shape groups partial machining paths included in the machining path of the machining path data generated by the machining path generation unit belong to; a path length addition unit adding and summarizing path lengths of the partial machining paths for the respective shape groups on the basis of a result of determination by the shape group determination unit; a predicted machining time calculation unit calculating predicted machining times of the respective shape groups on the basis of the predicted machining speed table and the path lengths of the respective shape groups summarized by the path length addition unit; a predicted machining time summation unit calculating the predicted machining time of the machining path by summing the predicted machining times of the respective shape groups calculated by the predicted machining time calculation unit; and a display unit displaying the predicted machining time of the machining path calculated by the predicted machining time summation unit.

In the machining time prediction device, the shape group determination unit determines which shape groups among the shape groups machining-completed partial machining paths in actual machining by the wire discharge machining device based on the program belong to, wherein the machining time prediction device further includes: a machining-completed path length addition unit adding and summarizing the path lengths of the machining-completed partial machining paths for the respective shape groups on the basis of a result of determination by the shape group determination unit; an execution-completed machining time addition unit adding and summarizing execution-completed machining times for the respective shape groups on the basis of the result of determination by the shape group determination unit; a remaining path length calculation unit calculating remaining path lengths of the respective shape groups on the basis of the path lengths of all the partial machining paths of the respective shape groups summarized by the path length addition unit before the machining is started and the path lengths of the machining-completed partial machining paths of the respective shape groups summarized by the machining-completed path length addition unit; and an average machining speed calculation unit calculating average machining speeds of the respective shape groups on the basis of the path lengths of the machining-completed partial machining paths of the respective shape groups summarized by the machining-completed path length addition unit and the execution-completed machining times of the respective shape groups summarized by the execution-completed machining time addition unit, wherein the predicted machining time calculation unit calculates the predicted machining times of the remaining machining paths of the respective shape groups on the basis of the average machining speeds of the respective shape groups calculated by the average machining speed calculation unit and the remaining path lengths of the respective shape groups calculated by the remaining path length calculation unit, wherein the predicted machining time summation unit calculates a predicted machining time of a remaining machining path of the machining by summing the predicted machining times of the respective shape groups calculated by the predicted machining time calculation unit, and wherein the display unit displays the predicted machining time of the remaining machining path of the machining calculated by the predicted machining time summation unit.

In the machining time prediction device, the average machining speed calculation unit updates the predicted machining speed registered in the predicted machining speed table on the basis of the calculated average machining speeds of the respective shape groups.

According to the present invention, since a highly-accurate predicted machining time which is not affected by a machining shape can be acquired, it is possible to easily manage machining plan or estimate work cost.

BRIEF DESCRIPTION OF THE DRAWINGS

The foregoing and other objects and features of the present invention will be apparent from the description of the following embodiments with reference to the attached drawings of figures:

FIG. 3 is a diagram illustrating examples of path lengths for shape groups;

FIG. 4 is a diagram illustrating examples of predicted machining speed tables;

FIG. 5 is a diagram illustrating an example of a predicted machining speed table added with workpiece thickness;

FIG. 6 is a diagram illustrating examples of path lengths and predicted machining times;

FIG. 7 is a schematic flowchart illustrating processes executed in the machining time prediction device of FIG. 1;

FIG. 9 is a diagram illustrating examples of machining-completed path lengths and execution-completed machining times;

FIG. 10 is a diagram illustrating examples of average machining speeds of shape groups;

FIG. 12 is a diagram illustrating an example of a screen display when simulation of automatic operation in a wire discharge machining device is performed; and FIG. 13 is a diagram illustrating an example of a screen display during the actual machining when actual machining is started after the simulation illustrated in FIG. 12.

DETAILED DESCRIPTION OF THE PREFERRED EMBODIMENTS

Hereinafter, embodiments of the present invention will be described with reference to the drawings.

Figure 1:
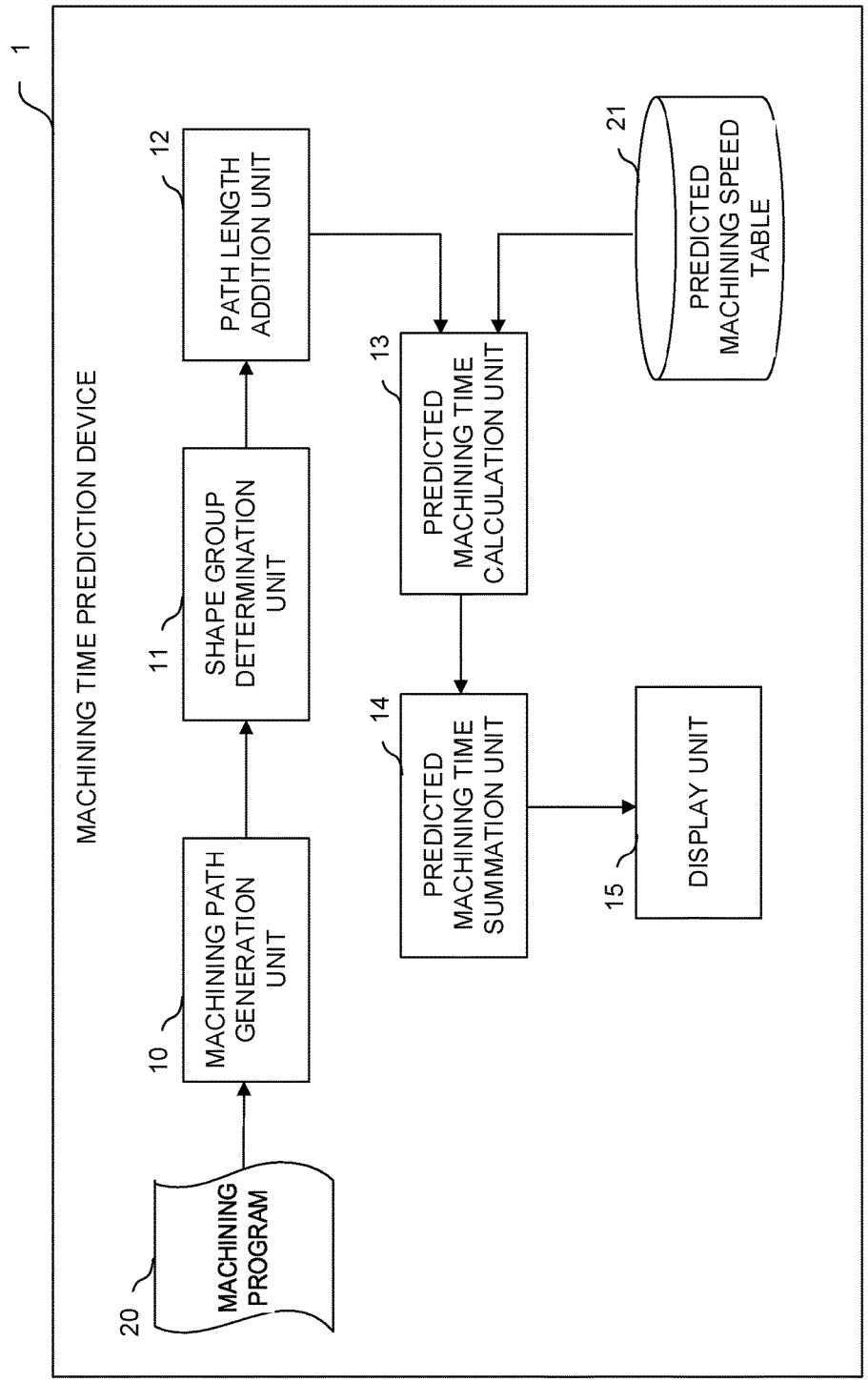
FIG. 1 is a functional block diagram illustrating a machining time prediction device according to a first embodiment of the present invention.

FIG. 1 is a functional block diagram illustrating a machining time prediction device according to a first embodiment of the present invention. In the embodiment, considered is a machining time prediction device which predicts a machining time in simulation of automatic operation based on a machining program before the start of machining operation. The machining time prediction device 1 is configured to include a machining path generation unit 10, a shape group determination unit 11, a path length addition unit 12, a predicted machining time calculation unit 13, a predicted machining time summation unit 14, and a display unit 15.

The machining path generation unit 10 reads a machining program 20 stored in a memory (not shown), sequentially performs analysis by performing simulation on the basis of the read machining program 20, and generates machining path data of wire discharge machining including machining path in the case of performing operation on the basis of the machining program 20 and information such as a taper angle obtained from a slope of a wire at the time of machining at positions on the machining path. The machining path generation unit 10 may be configured to sequentially generate the machining path data for each block included in the machining program 20.

Figure 2:
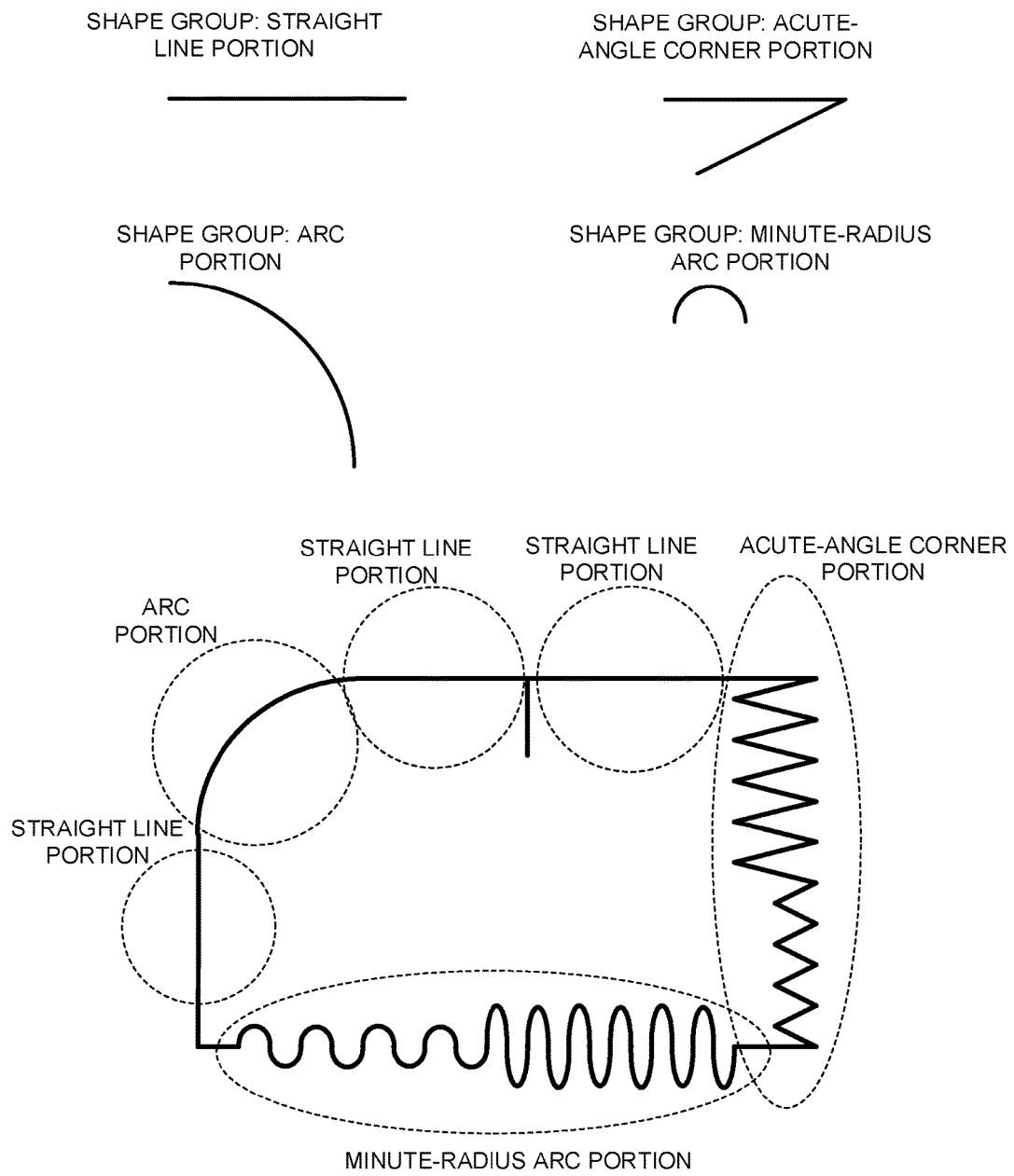
FIG. 2 is a diagram illustrating shape groups in the present invention.

The shape group determination unit 11 performs shape group determination of determining which shape group each partial machining path of the machining paths of the machining path data which are generated by the machining path generation unit 10 belongs to. The shape groups are group classified on the basis of a shape, a taper angle, or the like of the machining path. In the wire discharge machining device, for example, between the case of machining a straight-line machining path and the case of machining a circular-arc machining path, the machining speed is different according to a control algorithm, a machining condition, or the like. The shape groups are used to classify partial machining paths which machining is to be performed at different machining speeds. In the classification of the shape groups, classifications based on the specification (switching of an algorithm of a system program used for control or a machining condition) of the wire discharge machining device may be generated according to a change in machining speed for each partial machining path. Examples of the shape groups are illustrated in FIG. 2. In the examples illustrated in FIG. 2, a partial machining path of a shape where a machining path exhibits a straight line may be defined as a straight line portion, a partial machining path of a shape where a machining path exhibits an arc may be defined as an arc portion, a partial machining path where a machining path is bent at an acute angle of 90° or less may be defined as an acute-angle corner portion, and a partial machining path where a machining path exhibits a minute-radius circle may be defined as a minute-radius arc portion. These shape groups may be further classified in detail according to a taper angle, an arc radius, a corner angle, or the like.

In the shape group determination performed by the shape group determination unit 11, it is determined which shape group each partial machining path of the machining path included in the machining path data belongs to. For example, if attention is paid on only the shape, it is determined that the partial machining paths of the machining path illustrated in FIG. 12 belong to the respective shape groups illustrated below in FIG. 2 (actually, the partial machining paths may be further classified more in detail according to taper angles, arc radii, corner angles, or the like of the of the respective partial machining paths). The shape group determination unit 11 may set one block or two blocks of the machining program 20 analyzed by the machining path generation unit 10 as partial machining path and, after that, may determine the shape groups of the partial machining paths. In addition, as described above, the shape group determination unit may divides the machining path into partial machining paths and determine the shape groups of the partial machining paths on the basis of the specification (switching of an algorithm of a system program used for control or a machining condition) of the wire discharge machining device.

The path length addition unit 12 adds and summarizes the path lengths of the partial machining paths of the machining path which is an object of determination by the shape group determination unit 11 for the respective shape groups. FIG. 3 illustrates an example where the path length addition unit 12 adds the path lengths of the partial machining paths constituting the machining path for the respective shape groups which the partial machining paths belong to.

The predicted machining time calculation unit 13 calculates the predicted machining times of the respective shape groups to which the partial machining paths of the machining path as an object belong on the basis of the path lengths of the partial machining paths added and summarized for the respective shape groups by the path length addition unit 12, the predicted machining speed table 21 stored in advance in a memory (not shown), and the machining condition selected in the machining.

FIG. 4 illustrates an example of the predicted machining speed table 21. As illustrated in FIG. 4, in the predicted machining speed table 21, predicted machining speeds of the respective shape groups having different machining speeds for respective machining conditions identified by numbers are registered. The predicted machining speeds of the respective shape groups registered in the predicted machining speed table 21 are registered by measuring average machining speeds of the respective shape groups in machining condition generation before shipment of a machine. As illustrated in FIG. 5, in the predicted machining speed table 21, in addition to the condition such as workpiece thickness affecting the machining speed, predicted machining speeds of the respective shape groups with respect to each workpiece thickness may be registered. In this manner, by further adding the parameter, it is possible to further improve accuracy of the predicted machining time.

The predicted machining time summation unit 14 calculates the predicted machining time of the total machining path length as an object of calculation by summing the predicted machining times of the respective shape groups which the respective partial machining paths of the machining paths as an object of calculation by the predicted machining time calculation unit 13 belong to.

FIG. 6 illustrates an example of the predicted machining times of the respective shape groups calculated by the predicted machining time calculation unit 13 and the predicted machining time of the total machining path length which is an object of calculation by the predicted machining time summation unit 14.

The display unit 15 displays the predicted machining time of the total machining path length which is an object of the calculation by the predicted machining time summation unit 14 on a display (not shown) such as a liquid crystal display. The display unit 15 may display the predicted machining time together with the machining path as a result of simulation based on the machining program 20. In addition, the display unit may display the predicted machining times of the respective partial machining paths.

FIG. 7 is a schematic flowchart illustrating processes executed in the machining time prediction device according to the embodiment.

[Step SA01] The machining path generation unit 10 performs simulation on the basis of a machining program 20 and generates machining path data of wire discharge machining including a machining path in the case of performing operation based on the machining program 20 and information such as a taper angle obtained from a slope of a wire in the machining at each position on the machining path.

[Step SA02] The shape group determination unit 11 determines shape groups of partial machining paths in units of one block or two blocks of the machining program 20.

[Step SA03] The path length addition unit 12 calculates path lengths of the respective shape groups by adding path lengths of the partial machining paths belonging to the shape group for the respective shape groups determined in step SA02.

[Step SA04] The predicted machining time calculation unit 13 calculates the predicted machining times of the respective shape groups on the basis of the path lengths of the respective shape groups calculated in step SA03, the predicted machining speed table 21, and the machining condition data.

[Step SA05] The predicted machining time summation unit 14 calculates the predicted machining time of the total machining path length generated in step SA01 by summing the predicted machining times of the respective shape groups calculated in the step SA04.

[Step SA06] The display unit 15 displays the predicted machining time of the total machining path length calculated in step SA05 on a display.

In the machining time prediction device 1 according to the above-described embodiment, before the machining based on the machining program 20 is started, highly-accurate machining time prediction can be performed based on a shape, a taper angle, or a machining condition of the machining path according to the machining program 20.

The machining time prediction device 1 according to the embodiment may be mounted on a control device of the wire discharge machining device or on a simulation device of the wire discharge machining device. In addition, the machining time prediction device 1 according to the embodiment may be mounted on a PC.

Figure 8:
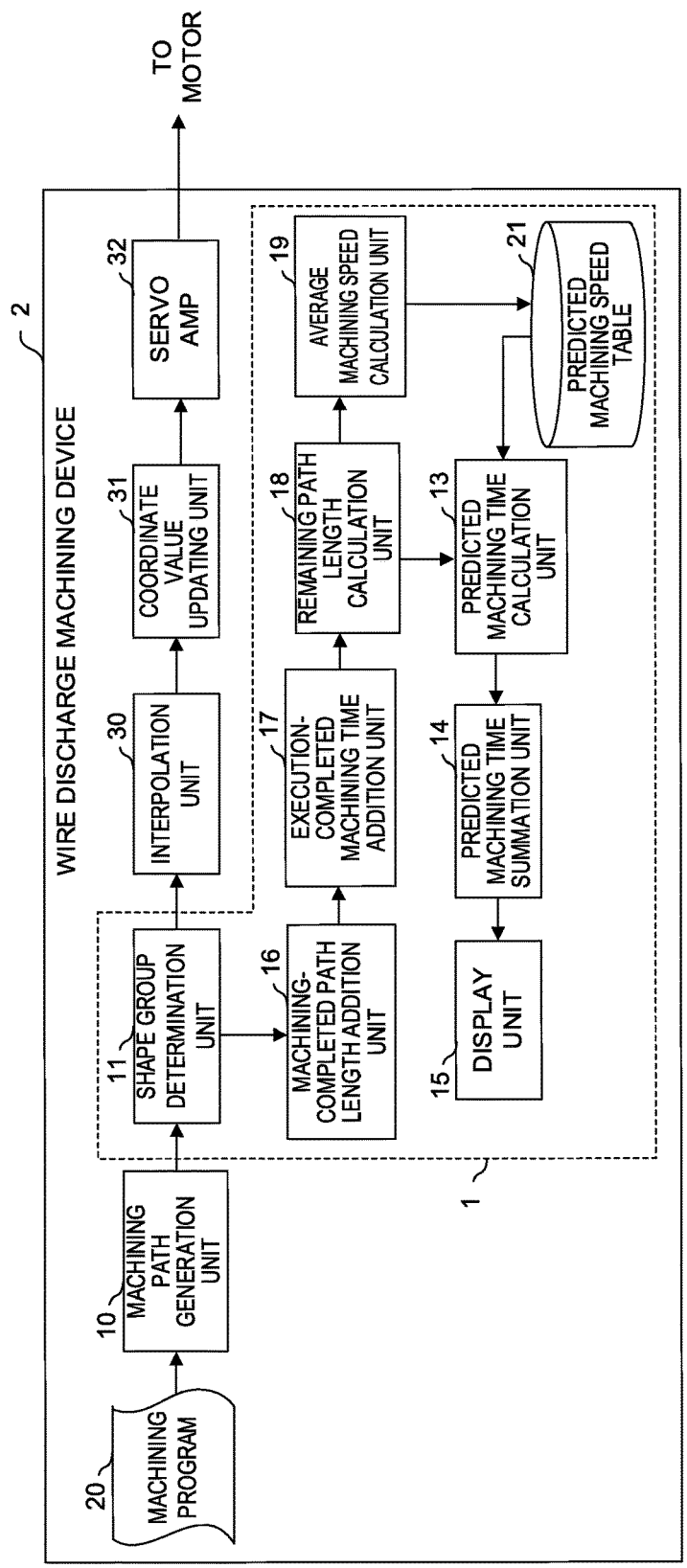
FIG. 8 is a functional block diagram illustrating a machining time prediction device according to a second embodiment of the present invention.

FIG. 8 is a functional block diagram illustrating a machining time prediction device according to a second embodiment of the present invention. In the embodiment, considered is a machining time prediction device which performs shape group determination on machining-completed paths and calculates machining-completed path lengths of shape groups and actual machining-completed machining times of the respective shapes during actual machining operation on a wire discharge machining device. The machining time prediction device 1 according to the embodiment is configured to be incorporated into a wire discharge machining device 2 including a machining path generation unit 10, an interpolation unit 30, a coordinate value updating unit 31, and a servo amp 32. Therefore, the machining time prediction device 1 includes a shape group determination unit 11, a machining-completed path length addition unit 16, an execution-completed machining time addition unit 17, a remaining path length calculation unit 18, an average machining speed calculation unit 19, the predicted machining time calculation unit 13, a predicted machining time summation unit 14, and a display unit 15.

In the wire discharge machining device 2, the interpolation unit 30 generates interpolation data indicating a moving amount of each motor of every interpolation period with respect to the machining path generated by the machining path generation unit 10 based on the machining program 20, the coordinate value updating unit 31 performs updating of coordinate values of each axis driven by each motor on the basis of the generated interpolation data to drive the servo amp 32, so that the motor of each component of the wire discharge machining device is controlled.

Similarly to the first embodiment, the shape group determination unit 11 determines the shape groups of the respective partial machining paths of the machining path on the basis of the machining path generated by the machining path generation unit 10.

The machining-completed path length addition unit 16 adds and summarizes of the path lengths of the machining-completed partial machining paths of the respective shape groups determined by the shape group determination unit 11.

The execution-completed machining time addition unit 17 measures the actual machining times taken for the machining of the machining-completed partial machining paths and adds and summarizes the measured machining times as the execution-completed machining times for the respective shape groups of the partial machining paths.

FIG. 9 illustrates an example of the machining-completed path lengths of the respective shape groups added and summarized by the machining-completed path length addition unit 16 and the execution-completed machining times of the respective shape groups added and summarized by the execution-completed machining time addition unit 17.

The remaining path length calculation unit 18 calculates the remaining path lengths of the respective shape groups by subtracting the machining-completed path lengths of the respective shape groups calculated by the machining-completed path length addition unit 16 from the path lengths of the respective shape groups calculated by the configuration of the first embodiment before the machining is started.

The average machining speed calculation unit 19 calculates the average machining speeds of the respective shape groups on the basis of the machining-completed path lengths of the respective shape groups added and summarized by the machining-completed path length addition unit 16 and the execution-completed machining times of the respective shape groups added to be summarized by the execution-completed machining time addition unit 17. FIG. 10 illustrates an example of the average machining speeds of the respective shape groups calculated by the average machining speed calculation unit 19.

The average machining speed calculation unit 19 may update the predicted machining speeds of the respective shape groups stored in the predicted machining speed table 21 on the basis of the calculated average machining speeds of the respective shape groups. As an updating method, the predicted machining speeds of the respective shape groups stored in the predicted machining speed table 21 may be overwritten by the average machining speeds of the respective shape groups calculated by the average machining speed calculation unit 19, or in the case where the average machining speeds of the respective shape groups calculated by the average machining speed calculation unit 19 is more than or less than the predicted machining speeds of the respective shape groups stored in the predicted machining speed table 21, the predicted machining speeds of the respective shape groups stored in the predicted machining speed table 21 may be corrected according to an exceeding amount or a lacking amount. In addition, replacing with specified values of the predicted machining speeds of the respective shape groups in a memory and values considering the average machining speeds of the respective shape groups is effective means.

The predicted machining time calculation unit 13 calculates the predicted machining time of the remaining machining paths of the respective shape group on the basis of the predicted machining speeds of the respective shape groups stored in the predicted machining speed table 21 and the remaining path lengths of the respective shape groups calculated by the remaining path length calculation unit 18.

The predicted machining time summation unit 14 obtains the predicted machining time of the remaining machining path by summing the predicted machining times of the remaining machining paths of the respective shape groups calculated by the predicted machining time calculation unit 13.

Next, the display unit 15 displays the predicted machining time of the remaining machining path calculated by the predicted machining time summation unit 14 on a display (not shown) such as a liquid crystal display. As illustrated in FIG. 13, the display unit 15 may display the predicted machining time of the remaining machining path together with display indicating the current machining situation. In addition, the display unit may display the predicted machining times of the remaining machining paths of the respective shape groups.

Figure 11:
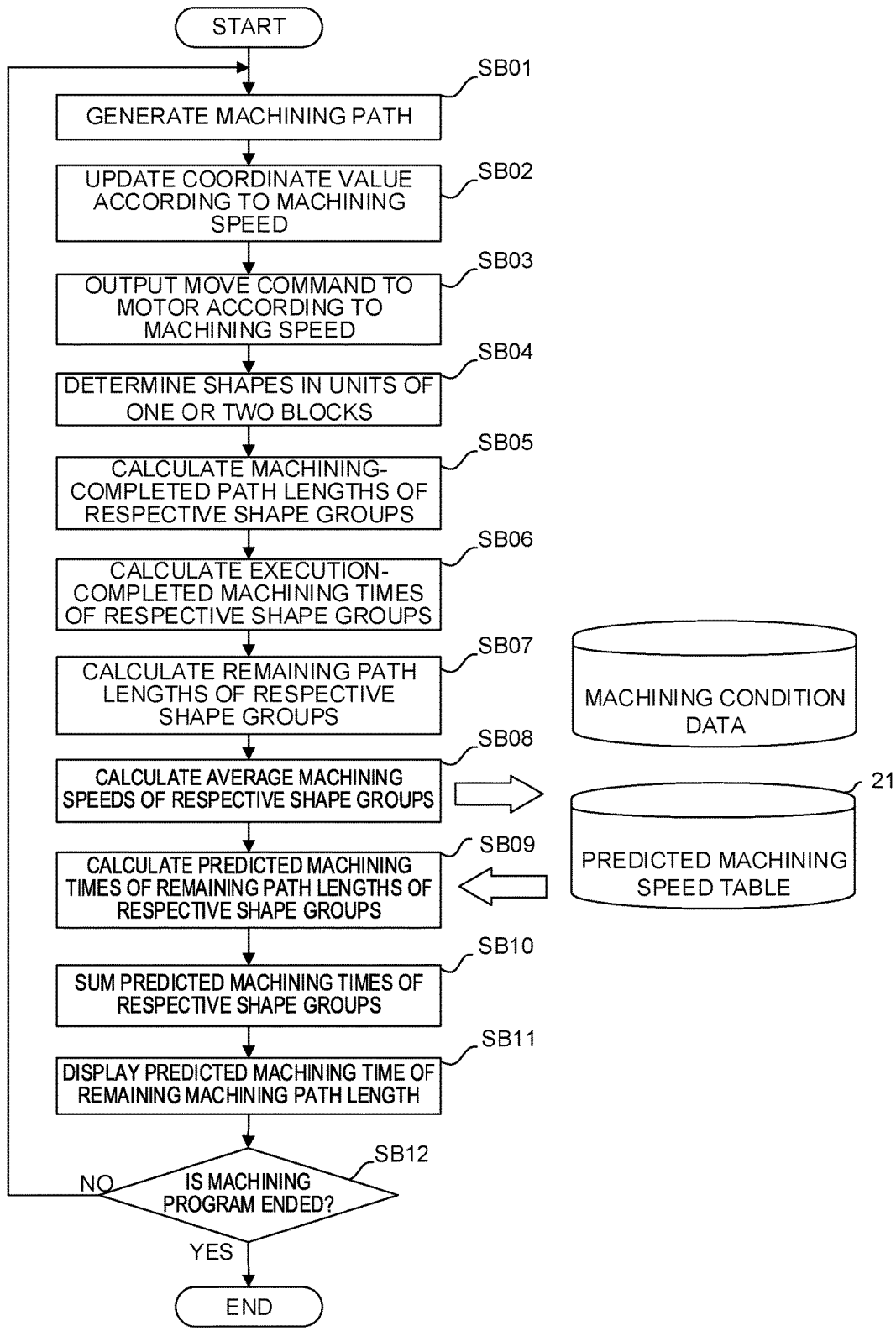
FIG. 11 is a schematic flowchart illustrating processes executed in the machining time prediction device of FIG. 8.

FIG. 11 is a schematic flowchart illustrating processes executed in the machining time prediction device according to the embodiment.

[Step SB01] The machining path generation unit 10 sequentially reads blocks from the machining program 20 to perform analysis and generates machining path data on the basis of the read blocks.

[Step SB02] The interpolation unit 30 generates interpolation data in every interpolation period according to a machining speed on the basis of the machining path data, and the coordinate value updating unit 31 updates coordinate values of each axis on the basis of the interpolation data.

[Step SB03] The servo amp 32 outputs a move command to a motor according to the interpolation data to control the motor.

[Step SB04] The shape group determination unit 11 determines shape groups of partial machining paths in units of one block or two blocks of the machining program 20.

[Step SB05] The machining-completed path length addition unit 16 adds and summarizes the machining-completed path lengths of the respective shape groups.

[Step SB06] The execution-completed machining time addition unit 17 adds and summarizes the execution-completed machining times of the respective shape groups.

[Step SB07] The remaining path length calculation unit 18 calculates the remaining path lengths of the respective shape groups.

[Step SB08] The average machining speed calculation unit 19 calculates the average machining speeds of the respective shape groups on the basis of the machining-completed path lengths of the respective shape groups calculated in step SB05 and the execution-completed machining times of the respective shape groups calculated in step SB06 and updates the predicted machining speeds of the respective shape groups registered in the predicted machining speed table 21.

[Step SB09] The predicted machining time calculation unit 13 calculates the predicted machining times of the remaining machining paths of the respective shape groups on the basis of the remaining path lengths of the respective shape groups calculated in step SB07, the predicted machining speed table 21, and the machining condition data.

[Step SB10] The predicted machining time summation unit 14 calculates the predicted machining time of the remaining machining path by summing the predicted machining times of the remaining machining paths of the respective shape groups calculated in step SB09.

[Step SB11] The display unit 15 displays the predicted machining time of the remaining machining path calculated in step SB10 on a display.

[Step SB12] It is determined whether or not machining based on the machining program is ended. In the case where the machining based on the machining program is ended, the process is ended, and in the case where the machining is not ended, the process proceeds to step SB01.

In the machining time prediction device 1 according to the embodiment described above, after the machining based on the machining program 20 is started, during the machining, highly-accurate remaining machining time prediction can be performed on the basis of a shape, a taper angle, a machining condition, or the like of the machining path by the machining program 20.

Heretofore, although the embodiments of the present invention are described, the present invention is not limited to the above-described embodiments, various aspects can be embodied through various modifications.

The invention claimed is:

1. A machining time prediction device predicting a time taken for machining by a wire discharge machining device based on a program, comprising:
   a processor;
   a memory for storing the program;
   a display device; and
   a predicted machining speed table where predicted machining speeds are registered in association with a plurality of shape groups used for classification based on at least a shape of a machining path,
   wherein the processor is configured to
      execute a machining path generation process for generating machining path data including the machining path based on the program,
      execute a shape group determination process for determining which shape groups among the plurality of shape groups partial machining paths included in the machining paths of the machining path data generated by the machining path generation process belong to,
      execute a path length addition process for adding and summarizing path lengths of the partial machining paths for the respective shape groups on the basis of a result of determination by the shape group determination process for,
      execute a predicted machining time calculation process for calculating predicted machining times of the respective shape groups on the basis of the predicted machining speed table and the path lengths of the respective shape groups summarized by the path length addition process,
      execute a predicted machining time summation process for calculating the predicted machining time of the machining path by summing the predicted machining times of the respective shape groups calculated by the predicted machining time calculation process, and
   a display process for displaying, on the display device, the predicted machining time of the machining path calculated by the predicted machining time summation process, so that a workpiece, which has been machined by the wire discharge machining device along the machining path based on the program, is removed from the wire discharge machining device at the end of the predicted machining time.

2. The machining time prediction device according to claim 1,
   wherein the shape group determination process determines which shape groups among the plurality of shape groups machining-completed partial machining paths in actual machining by the wire discharge machining device based on the program belong to,
   wherein the processor is further configured to:
      execute a machining-completed path length addition process for adding and summarizing the path lengths of the machining-completed partial machining paths for the respective shape groups on the basis of a result of determination by the shape group determination process;
      execute an execution-completed machining time addition process for adding and summarizing execution-completed machining times for the respective shape groups on the basis of the result of determination by the shape group determination process;
      execute a remaining path length calculation process for calculating remaining path lengths of the respective shape groups on the basis of the path lengths of all the partial machining paths of the respective shape groups summarized by the path length addition process before the machining is started and the path lengths of the machining-completed partial machining paths of the respective shape groups summarized by the machining-completed path length addition process; and
      execute an average machining speed calculation process for calculating average machining speeds of the respective shape groups on the basis of the path lengths of the machining-completed partial machining paths of the respective shape groups summarized by the machining-completed path length addition process and the execution-completed machining times of the respective shape groups summarized by the execution-completed machining time addition process,
   wherein the predicted machining time calculation process calculates the predicted machining times of the remaining machining paths of the respective shape groups on the basis of the average machining speeds of the respective shape groups calculated by the average machining speed calculation process and the remaining path lengths of the respective shape groups calculated by the remaining path length calculation process, wherein the predicted machining time summation process calculates a predicted machining time of a remaining machining path of the machining by summing the predicted machining times of the respective shape groups calculated by the predicted machining time calculation process, and wherein the display process displays, on the display device, the predicted machining time of the remaining machining path of the machining calculated by the predicted machining time summation process.

3. The machining time prediction device according to claim 2, wherein the average machining speed calculation process updates the predicted machining speed registered in the predicted machining speed table on the basis of the calculated average machining speeds of the respective shape groups.

4. The machining time prediction device according to claim 1, wherein the wire discharge machining device includes a motor and a servo amplifier for controlling the motor, and the processor is configured to generate interpolation data indicating a moving amount of the motor of every interpolation period with respect to the machining path generated by the machining path generating process based on the machining program, update a coordinate value of each axis driven by the motor on the basis of the generated interpolation data, and control the servo amplifier to output a move command to the motor according to the interpolation data to control the motor.

\* \* \* \* \*